US012218619B2

(12) United States Patent
Ham et al.

(10) Patent No.: US 12,218,619 B2
(45) Date of Patent: Feb. 4, 2025

(54) SYSTEM AND METHOD FOR DETECTING RESOLVER SIGNAL FOR MOTOR CONTROL

(71) Applicants: HYUNDAI MOTOR COMPANY, Seoul (KR); KIA CORPORATION, Seoul (KR)

(72) Inventors: Do Hyeon Ham, Goyang-si (KR); Ho Jun Shin, Incheon (KR); Hun Kong, Suwon-si (KR); Jang Ho Won, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 190 days.

(21) Appl. No.: 17/989,227

(22) Filed: Nov. 17, 2022

(65) Prior Publication Data
US 2023/0238903 A1    Jul. 27, 2023

(30) Foreign Application Priority Data

Jan. 25, 2022  (KR) .......................... 10-2022-0010341

(51) Int. Cl.
H02P 6/18          (2016.01)
H02P 21/18         (2016.01)
(52) U.S. Cl.
CPC ............. H02P 6/188 (2013.01); H02P 21/18 (2016.02)
(58) Field of Classification Search
CPC ....................................................... H02P 23/12
See application file for complete search history.

(56) References Cited

U.S. PATENT DOCUMENTS

| 10,884,037 B2 | 1/2021 | Chellamuthu et al. |
| 2012/0010849 A1* | 1/2012 | Yamada .............. H03M 1/0617 |
| | | 702/151 |
| 2015/0288306 A1* | 10/2015 | Wu .......................... H02P 6/18 |
| | | 318/400.32 |

FOREIGN PATENT DOCUMENTS

| KR | 10-2005-0070723 A | 7/2005 |
| KR | 10-2009-0071927 A | 7/2009 |
| KR | 10-0936290 B1 | 1/2010 |
| KR | 10-2013-0025471 A | 3/2013 |
| KR | 10-1322070 B1 | 10/2013 |
| KR | 10-1610473 B1 | 4/2016 |
| KR | 10-2016-0066923 A | 6/2016 |
| KR | 10-2019384 B1 | 9/2019 |
| KR | 10-2020-0012572 A | 2/2020 |
| KR | 10-2020-0033060 A | 3/2020 |
| KR | 10-2020-0053772 A | 5/2020 |
| KR | 10-2020-0063459 A | 6/2020 |

* cited by examiner

*Primary Examiner* — Said Bouziane
(74) *Attorney, Agent, or Firm* — MORGAN, LEWIS & BOCKIUS LLP

(57) ABSTRACT

The present disclosure provides a system and method for detecting a resolver signal of a motor allowing accurate detection of a peak magnitude, a peak time, a peak point, etc. of a resolver output signal. A bandpass filter and a moving average processor are configured to remove noise introduced into the resolver output signal and maintain a magnitude of the resolver output signal at original magnitude without change. A phase compensation process performed by a lead phase compensator can compensate a phase delay time for the resolver output signal.

13 Claims, 9 Drawing Sheets

SYSTEM AND METHOD FOR DETECTING RESOLVER SIGNAL FOR MOTOR CONTROL

CROSS-REFERENCE TO RELATED APPLICATION

This application claims, under 35 U.S.C. § 119(a), the benefit of and priority from Korean Patent Application No. 10-2022-0010341 filed on Jan. 25, 2022, the entire contents of which are incorporated herein by reference.

TECHNICAL FIELD

The present disclosure relates to a system and method for detecting a resolver signal of a motor, and more particularly, to a system and method for detecting a resolver signal of a motor allowing accurate detection of a peak magnitude, a peak time, a peak point, etc. of a resolver output signal output from a resolver of a motor.

BACKGROUND

Eco-friendly vehicles, including hybrid vehicles, plug-in hybrid vehicles, electric vehicles (EVs), and hydrogen fuel cell vehicles, are each equipped with a driving motor such as a permanent magnet synchronous motor (PMSM).

In order to control a speed and torque of the motor, it is necessary to accurately detect a position of a rotor of the motor. To this end, a resolver is used as a position sensor for detecting an absolute position angle of the rotor.

Accordingly, when the motor is driven, position angle information of the rotor may be detected using sine and cosine waveform components output from the resolver. However, in order to improve the accuracy and efficiency of motor control, a position angle of the rotor needs to be detected as an accurate value without error.

As a conventional method of detecting a position angle of the rotor therefor, a method has been applied, and the method includes a step of inputting an excitation signal in the form of a square wave to the resolver, a step of generating a sine wave or a cosine wave as a resolver output signal by an excitation signal of the square wave passing through a filter included in a resolver circuit, a step of outputting the sine wave or the cosine wave, which is the resolver output signal, to a controller, and a step of detecting a peak point of the sine wave or the cosine wave, which is the resolver output signal, to determine the position angle of the rotor in the controller, etc.

In the accompanying drawings, FIG. 1 is a waveform diagram comparing an excitation signal of a square wave input to a resolver and a resolver output signal made of a sine wave or a cosine wave when no noise is introduced, and FIG. 2 is a waveform diagram illustrating the resolver output signal when no noise is introduced.

As illustrated in FIG. 1, when the excitation signal of the square wave passes through a filter to generate the sine wave or the cosine wave, a phase delay time $t_{delay}$ occurs, so that a peak point pk of the sine wave or the cosine wave may be determined by a synthesis time of the phase delay time $t_{delay}$ and a peak time $t_{pk}$ taken from an edge part of a waveform to the peak point. When harmonic noise, etc. is not introduced into the sine wave, which is the resolver output signal, the peak point pk of the sine wave or the cosine wave may be accurately detected. Accordingly, the position angle of the motor rotor may be accurately determined using the resolver output signal of the sine wave or the cosine wave in which the peak point pk is accurately detected.

Referring to FIG. 2, when harmonic noise is not introduced into the resolver output signal, the peak point pk of the sine wave or the cosine wave, which is the resolver output signal, may be accurately detected, and the peak magnitude of the resolver output signal may be accurately detected. Thus, it is easy to determine a magnetic flux position of the motor. Accordingly, the position angle of the motor rotor may be accurately determined.

In the accompanying drawings, FIG. 3 is a waveform diagram comparing an excitation signal of a square wave input to a resolver and a resolver output signal made of a sine wave or a cosine wave when noise is introduced, and FIG. 4 is a waveform diagram illustrating the resolver output signal when noise is introduced.

As illustrated in FIG. 3, when the excitation signal of the square wave passes through a filter to generate the sine wave or the cosine wave, a phase delay time $t_{delay}$ occurs, so that a peak point pk of the sine wave or the cosine wave may be determined by a synthesis time of the phase delay time $t_{delay}$ and a peak time $t_{pk}$ taken from an edge part of a waveform to the peak point. However, when harmonic noise, etc. is introduced into the sine wave or the cosine wave, which is the resolver output signal, it is difficult to accurately detect the peak point pk of the sine wave or the cosine wave due to distortion caused by noise. Accordingly, there is a problem in that a position angle error occurs when determining the position angle of the motor rotor.

Referring to FIG. 4, when harmonic noise is introduced into the resolver output signal, it is difficult to accurately detect the peak point pk of the sine wave or the cosine wave, which is the resolver output signal, and the peak magnitude of the resolver output signal is not accurately detected, for example, by being determined to be the peak magnitude detected by noise. Therefore, it is difficult to accurately determine the magnetic flux position of the motor, which causes a problem such as occurrence of an error in the position angle of the motor rotor that affects motor control.

Meanwhile, the noise introduced into the resolver output signal may be removed by using a bandpass filter. However, there is a problem in that a magnitude change and a phase delay time of the resolver output signal occur, or the noise cannot be completely removed.

For example, when a bandwidth of the bandpass filter is set to be small, the magnitude change and phase delay time of the resolver output signal are caused. Conversely, when the bandwidth of the bandpass filter is set to be large, there is a problem in that the noise introduced into the resolver output signal cannot be completely removed.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art, and an object of the present disclosure is to provide a system and method for detecting a resolver signal of a motor allowing accurate detection of a peak magnitude, a peak time, a peak point, etc. of a resolver output signal. A bandpass filter and a moving average processor are configured to remove noise introduced into the resolver output signal and maintain a magnitude of the resolver output signal at original magnitude without change. A phase compensation process performed by a lead phase compensator can compensate a phase delay time for the resolver output signal.

In one aspect, the present disclosure provides a system for detecting a resolver signal for controlling a motor, the system including a resolver configured to generate a resolver output signal of a sine wave or a cosine wave when the motor is driven, and output the resolver output signal to a controller, and the controller including a first bandpass filter for primarily removing noise introduced into the resolver output signal, a moving average processor for performing a continuous moving average calculation process for a resolver output signal passing through the first bandpass filter, and a lead phase compensator for compensating a phase of a resolver output signal passing through the moving average processor.

In a preferred embodiment, when the resolver output signal of a predetermined period passing through the first bandpass filter is sequentially input as continuous data to n preset buffers, the moving average processor may be configured to repeatedly calculate an average for each piece of sequentially input data.

In another preferred embodiment, the moving average processor may be configured to determine the number of pieces of data for moving average for an output signal of the resolver passing through the first bandpass filter by dividing a sampling frequency of a predetermined specific period by a frequency of an output signal of the resolver.

In still another preferred embodiment, the lead phase compensator may be configured to compensate the phase of the resolver output signal after passing through the moving average processor to a phase level of a resolver output signal before passing through the moving average processor, which is an original signal.

In yet another preferred embodiment, the lead phase compensator may be configured to determine a phase to be compensated by $$G_{leadComp}(s) = k\frac{1 + s/\omega_o}{1 + s/\omega_p}, .$$

$G_{leadComp}(s)$ denotes a phase to be compensated, k denotes a gain value, $\omega_o$ denotes the same value as a frequency value of an original signal which is the resolver output signal before passing through the moving average processor, and $\omega_p$ denotes a value set larger than the frequency value of the original signal.

In still yet another preferred embodiment, the controller may further include a differentiator configured to differentiate and output a resolver output signal having a phase compensated by passing through the lead phase compensator, a second bandpass filter configured to filter the differentiated resolver output signal output from the differentiator to extract a signal in a preset specific band, a reference point detector configured to detect a point in time when the differentiated resolver output signal passing through the second bandpass filter satisfies a reference voltage, a peak time detector configured to detect a peak time of the resolver output signal based on a point in time detected by the reference point detector, an edge time detector configured to detect an edge time of a square wave signal, a subtractor configured to subtract the edge time of the square wave signal detected by the edge time detector from the peak time of the resolver output signal detected by the peak time detector, and a delay time calculator configured to calculate a phase delay time based on a peak time of the resolver output signal subtracted by the subtractor.

In a further preferred embodiment, the controller may further include a limiter configured to remove a result of subtraction to prevent malfunction when the peak time of the resolver output signal subtracted by the edge time of the square wave signal by the subtractor is outside of a reference range.

In another aspect, the present disclosure provides a method for detecting a resolver signal for controlling a motor, the method including generating and outputting a resolver output signal of a sine wave or a cosine wave when the motor is driven, primarily removing, by a first bandpass filter, noise introduced into a resolver output signal, performing, by a moving average processor, a continuous moving average calculation process for a resolver output signal passing through the first bandpass filter, and performing, by a lead phase compensator, a process of compensating a phase of a resolver output signal passing through the moving average processor.

In a preferred embodiment, when the resolver output signal of a predetermined period passing through the first bandpass filter is sequentially input as continuous data to n preset buffers, the moving average calculation process may be performed by repeatedly calculating an average for each piece of sequentially input data.

In another preferred embodiment, the moving average calculation process may be performed by repeating a process of calculating an average for a resolver output signal of a predetermined period passing through the first bandpass filter, which is data sequentially input to the n preset buffers, a process of excluding data input to a last buffer among the n preset buffers, a process of moving data input to the n preset buffers to adjacent buffers, a process of inputting new data to a first buffer among the n preset buffers, and a process of calculating an average for data input to the n preset buffers including newly input data.

In still another preferred embodiment, the process of compensating the phase may be a process of compensating the phase of the resolver output signal after passing through the moving average processor to a phase level of a resolver output signal before passing through the moving average processor, which is an original signal.

In yet another preferred embodiment, in the process of compensating the phase, a phase to be compensated may be determined by $$G_{leadComp}(s) = k\frac{1 + s/\omega_o}{1 + s/\omega_p}, .$$

$G_{leadComp}(s)$ denotes a phase to be compensated, k denotes a gain value, $\omega_o$ denotes the same value as a frequency value of the original signal which is the resolver output signal before passing through the moving average processor, and $\omega_p$ denotes a value set larger than the frequency value of the original signal.

In still yet another preferred embodiment, the method may further include differentiating a resolver output signal having a phase compensated by passing through the lead phase compensator, filtering the differentiated resolver output signal to extract a signal in a preset specific band, detecting a point in time when the differentiated resolver output signal satisfies a reference voltage, detecting a peak time of a resolver output signal based on a detected point in time, detecting an edge time of a square wave signal, subtracting the detected edge time of the square wave signal from the detected peak time of the resolver output signal, calculating a phase delay time based on a subtracted peak time of the resolver output signal, and removing a result of subtraction to prevent malfunction when the peak time of the resolver output signal subtracted by the edge time of the square wave signal is outside of a reference range.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated the accompanying drawings which are given herein below by way of illustration only, and thus are not limitative of the present disclosure, and wherein.

DETAILED DESCRIPTION

Hereinafter, reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Figure 1:
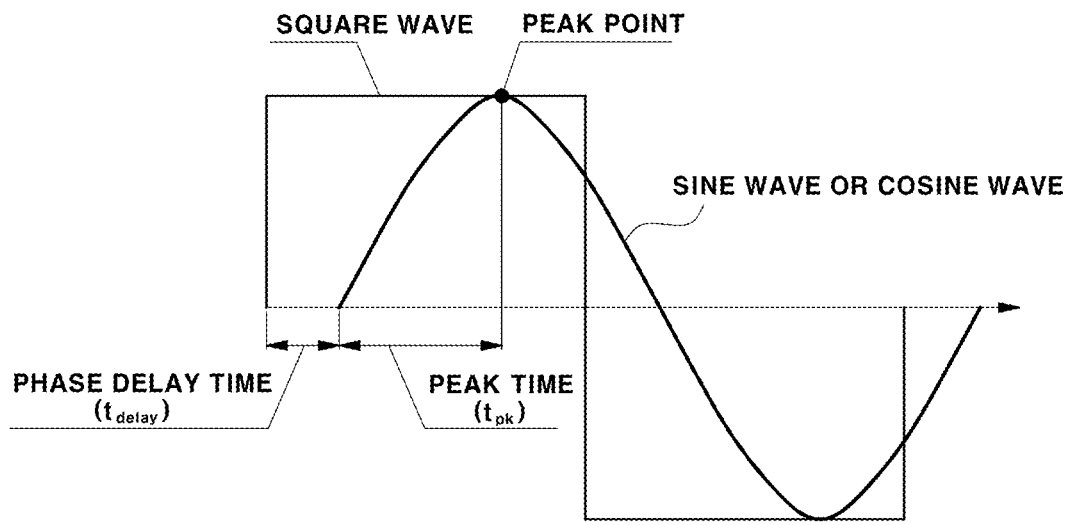
FIG. 1 is a waveform diagram comparing an excitation signal of a square wave input to a resolver and a resolver output signal made of a sine wave or a cosine wave when no noise is introduced.
Figure 2:
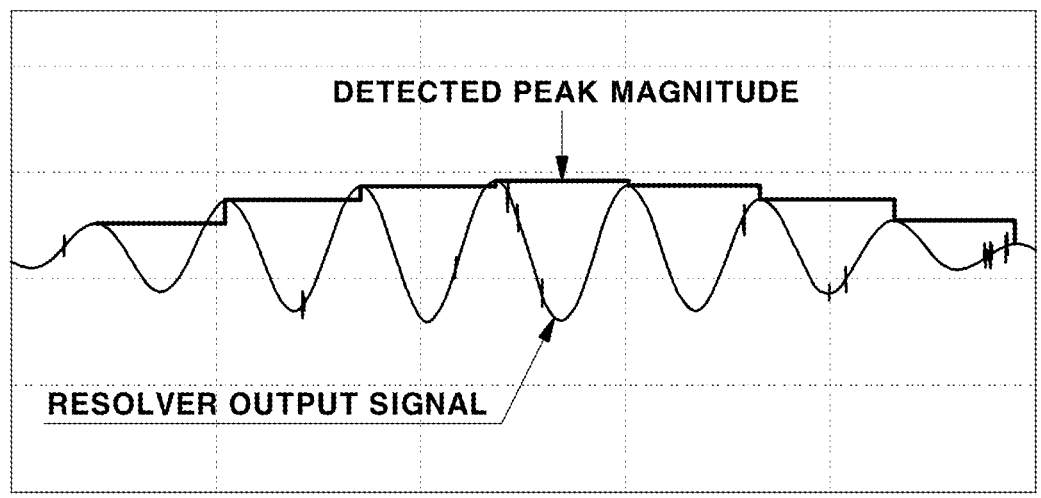
FIG. 2 is a waveform diagram illustrating the resolver output signal when no noise is introduced.
Figure 3:
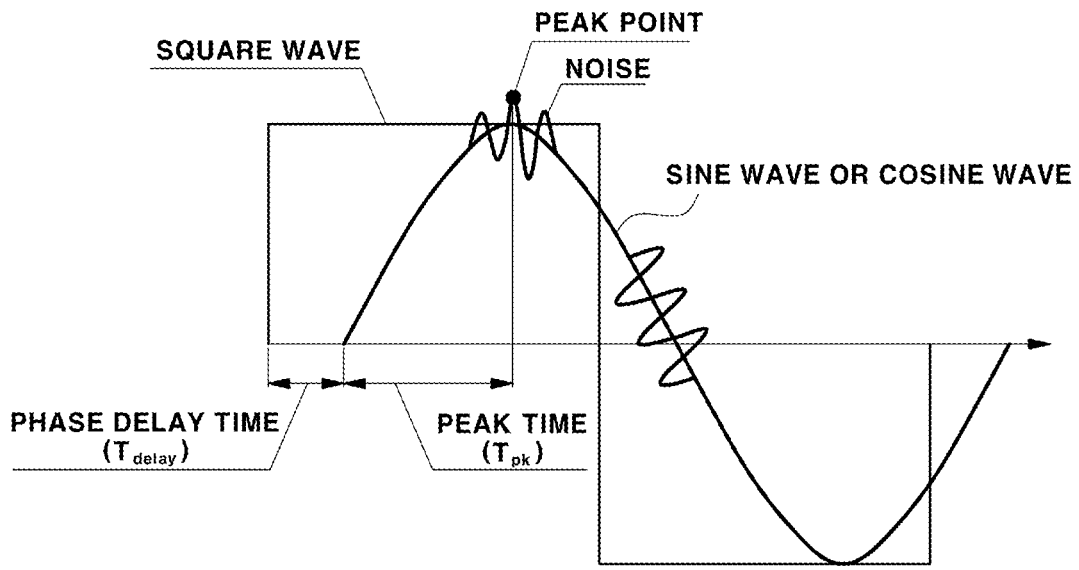
FIG. 3 is a waveform diagram comparing an excitation signal of a square wave input to a resolver and a resolver output signal made of a sine wave or a cosine wave when noise is introduced.
Figure 4:
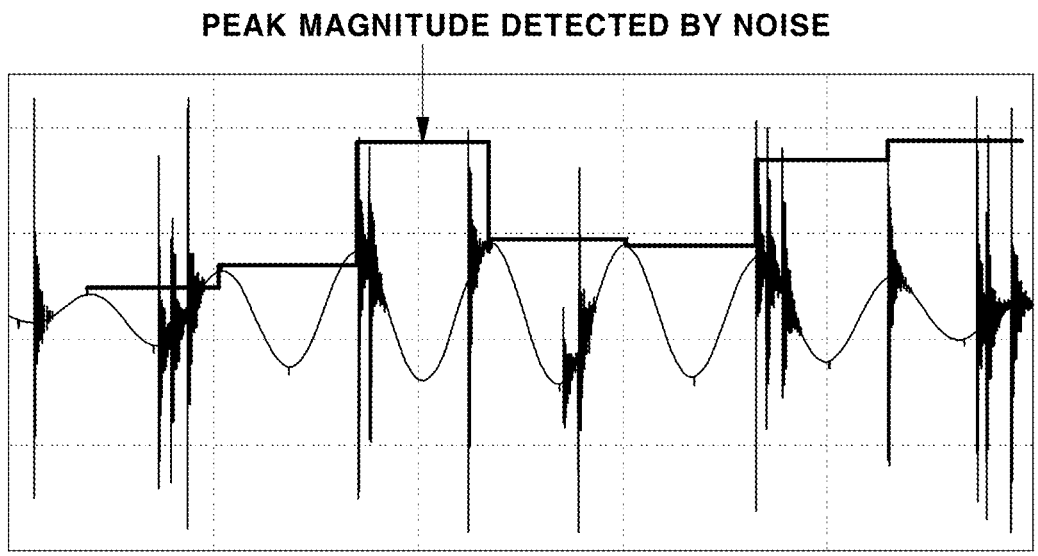
FIG. 4 is a waveform diagram illustrating the resolver output signal when noise is introduced.
Figure 5:
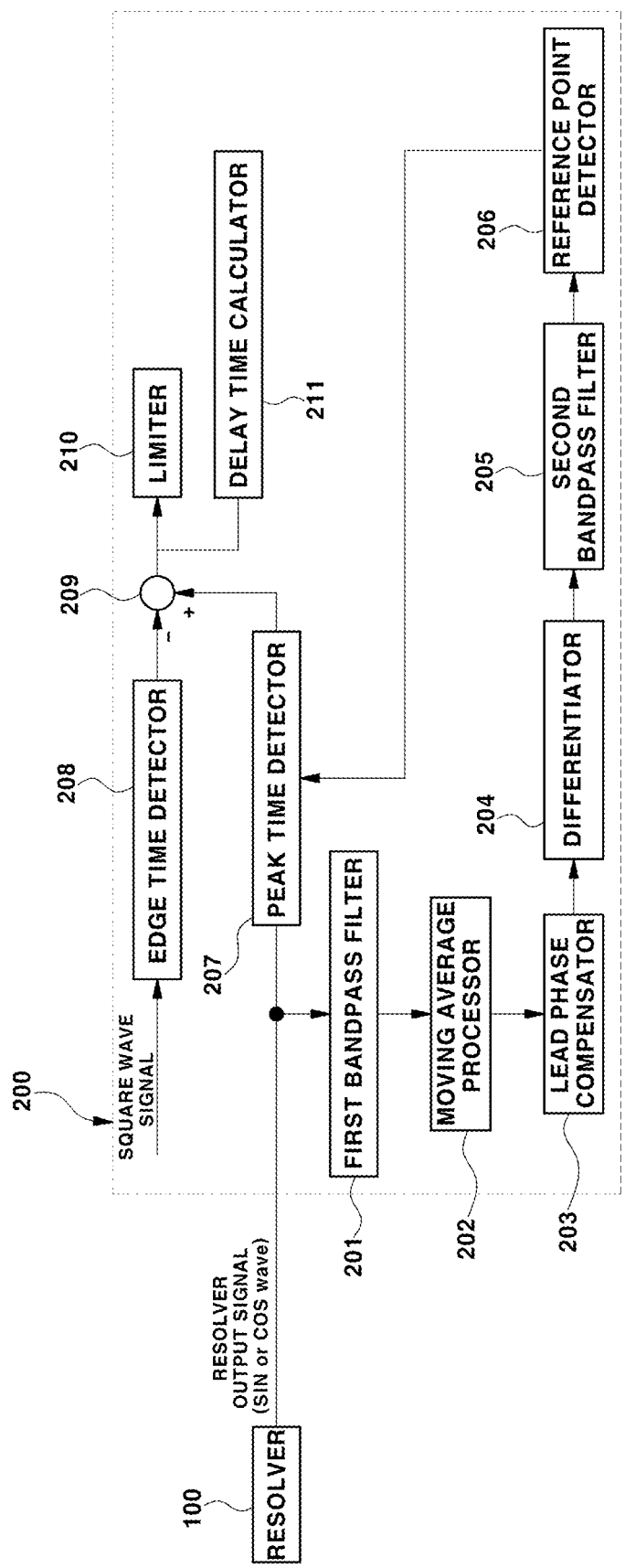
FIG. 5 is a configuration diagram illustrating a system for detecting a resolver signal of a motor according to the present disclosure.

FIG. 5 is a configuration diagram illustrating a system for detecting a resolver signal of a motor according to the present disclosure.

As illustrated in FIG. 5, a sine wave or a cosine wave, which is a resolver output signal, is output from a resolver 100 to a controller 200.

The resolver 100 is a type of position sensor for detecting an absolute position angle of a motor rotor, which converts an excitation signal in the form of a square wave according to motor driving into a sine wave or a cosine wave using a filter included in a resolver circuit, and then outputs the sine wave or the cosine wave to the controller 200.

Accordingly, a resolver output signal, which is a sine wave or a cosine wave, may be output from the resolver 100 to the controller 200.

The controller 200 is configured to be able to primarily remove noise of the resolver output signal output from the resolver 100 using a first bandpass filter, then completely remove noise in the resolver output signal through a continuous moving average calculation process for the resolver output signal and a lead compensation process for phase compensation, and accurately detect a peak magnitude, a peak time, a peak point, etc. of the resolver output signal.

To this end, as illustrated in FIG. 5, the controller 200 includes a first bandpass filter 201, a moving average processor 202, and a lead phase compensator 203.

The first bandpass filter 201 serves to primarily remove noise introduced into the resolver output signal.

However, even when the resolver output signal output from the resolver 100 passes through the first bandpass filter 201, some noise is not completely removed, and a magnitude change and a phase delay time of the resolver output signal may occur. In order to solve this problem, the controller 200 of the present disclosure includes the moving average processor 202, and the lead phase compensator 203.

The moving average processor 202 is configured to perform the continuous moving average calculation process for the resolver output signal passing through the first bandpass filter 201 to remove residual noise included in the resolver output signal without changing the magnitude of the resolver output signal.

To this end, when continuous data (resolver output signal of a predetermined period passing through the first bandpass filter) is sequentially input to n preset buffers, the moving average processor 202 is configured to repeatedly calculate an average for each piece of the sequentially input data.

The n is the predetermined number of buffers.

Figure 7:
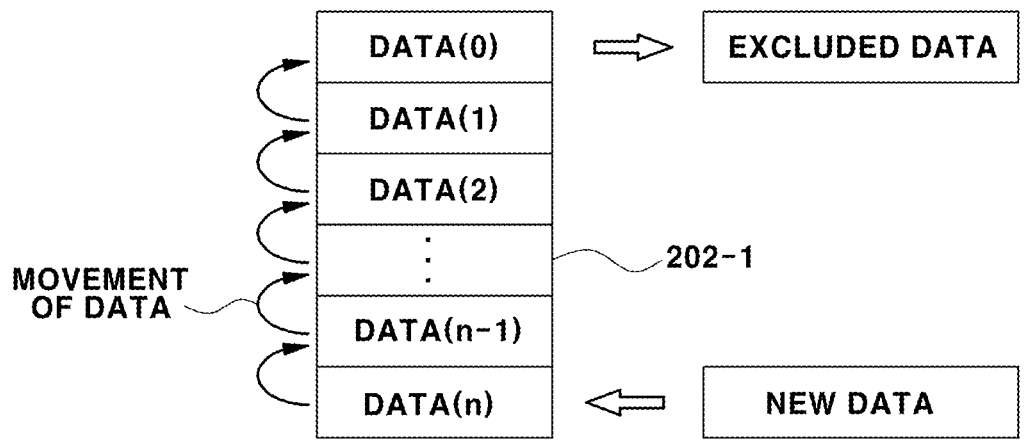
FIG. 7 is a conceptual diagram illustrating a moving average method of a moving average processor in a configuration of a resolver signal detection system for the motor according to the present disclosure.
Figure 8:
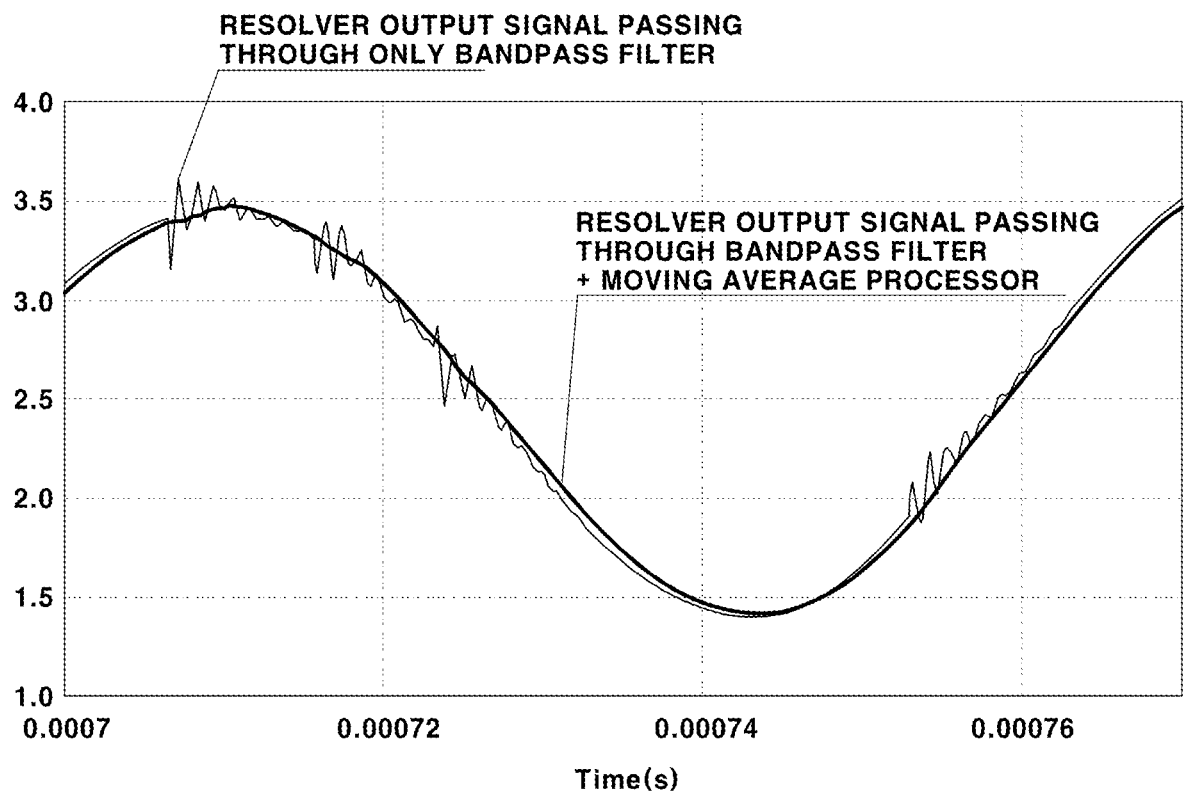
FIG. 8 is a waveform diagram comparing a resolver output signal after passing through a bandpass filter and the moving average processor in the configuration of the resolver signal detection system for the motor according to the present disclosure with an existing resolver output signal after passing through only the bandpass filter.
Figure 9:
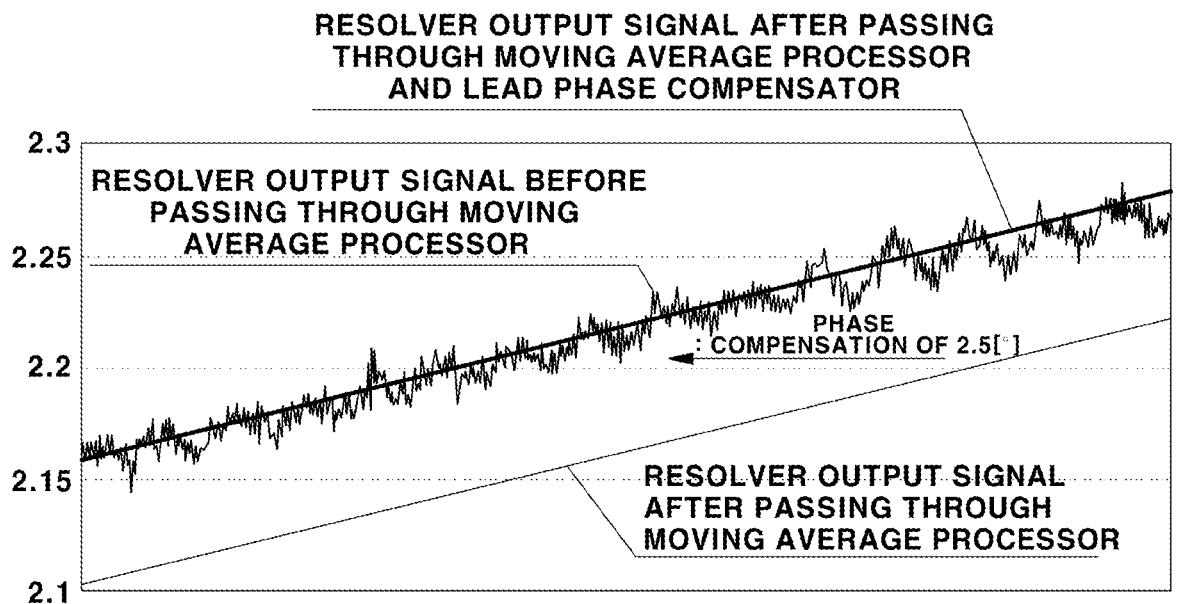
FIG. 9 is a waveform diagram comparing a resolver output signal after passing through a lead phase compensator in the configuration of the resolver signal detection system for the motor according to the present disclosure with a resolver output signal of an original signal and a resolver output signal after passing through the moving average processor.

For example, as illustrated in FIG. 7, when the moving average processor 202 repeats a process of calculating an average for data (resolver output signal of a predetermined period passing through the first bandpass filter) sequentially input to n preset buffers 202-1, a process of excluding data input to a last buffer among the n buffers 202-1, a process of moving data input to the n buffers 202-1 to adjacent buffers 202-1, a process of inputting new data to a first buffer among the n buffers 202-1, and a process of further calculating an average for data input to the n buffers 202-1 including the newly input data, noise included in the resolver output signal may be completely removed, and a magnitude of the resolver output signal from which noise is removed may be maintained at an original signal magnitude (original magnitude of the resolver output signal before introduction of noise output from the resolver).

As described above, the resolver output signal after passing through the first bandpass filter 201 and the moving average processor 202 in order may be in a state in which noise is completely removed without magnitude change.

Preferably, the number of pieces of data for the moving average for the output signal of the resolver passing through the first bandpass filter may be determined by dividing a sampling frequency of a predetermined specific period by a frequency of the output signal of the resolver.

At this time, the resolver output signal passing through the first bandpass filter 201 and the moving average processor 202 may be maintained at the original signal magnitude with residual noise removed. However, a phase difference and a phase delay may occur compared to the original signal.

To this end, the lead phase compensator 203 is configured to compensate a phase of the resolver output signal after passing through the moving average processor 202 to a phase level of an original signal (resolver output signal before passing through the moving average processor).

More specifically, the lead phase compensator 203 is a type of filter for phase compensation, and is configured to detect a phase difference between the resolver output signal before passing through the moving average processor 202 and the resolver output signal after passing through the moving average processor 202, and then compensate the phase of the resolver output signal after passing through the moving average processor 202 to a phase level thereof before passing through the moving average processor 202 based on the detected phase difference.

To this end, the lead phase compensator 203 is configured to determine the phase to be compensated according to Equation 1 below.

$$G_{leadComp}(s) = k \frac{1 + s/\omega_o}{1 + s/\omega_p}. \quad \text{[Equation 1]}$$

In Equation 1 above, $G_{leadComp}(s)$ may be defined as a phase to be compensated, k denotes a gain value, $\omega_o$ may be defined as the same value as a frequency value of the original signal (the resolver output signal before passing through the moving average processor), and $\omega_p$ may be defined as a value set larger than the frequency value of the original signal (the resolver output signal before passing through the moving average processor).

More specifically, $\omega_o$ may be defined as $2 \times \pi \times f_o$ (the frequency of the original signal), and the $\omega_p$ may be defined as $2 \times \pi \times f_p$ (a value set larger than the frequency of the original signal for phase compensation).

At this time, when the value $\omega_p$ is greater than the value $\omega_o$ ($\omega_p > \omega_o$), the phase of the output signal is advanced with respect to the input signal. Therefore, the value $\omega_p$ needs to be set to a value greater than the value $\omega_o$.

Accordingly, using the value $\omega_o$ and the value $\omega_p$, the phase of the resolver output signal after passing through the moving average processor may be compensated (for example, +2.5°) to the phase level before passing through the moving average processor.

Meanwhile, as illustrated in FIG. 5, the controller 200 further includes a differentiator 204, a second bandpass filter 205, a reference point detector 206, a peak time detector 207, an edge time detector 208, a subtractor 209, a limiter 210 for limiting the peak time to prevent malfunction, a delay time calculator 211, etc.

The differentiator 204 differentiates a resolver output signal passing through the moving average processor 202 to remove noise and passing through the lead phase compensator 203 to have a compensated phase, and outputs the differentiated resolver output signal.

The second bandpass filter 205 filters the differentiated resolver output signal output from the differentiator 204 to extract a signal in a preset specific band.

The reference point detector 206 detects a point in time (for example, point of 0 V) at which the differentiated resolver output signal passing through the second bandpass filter 205 satisfies a reference voltage.

The peak time detector 207 detects the peak time of the resolver output signal based on the point in time detected by the reference point detector 206.

The edge time detector 208 detects an edge time of a square wave signal. At this time, the edge point detector 208 detects a frequency and amplitude of the square wave signal.

The subtractor 209 subtracts the edge time of the square wave signal detected by the edge time detector 208 from the peak time of the resolver output signal detected by the peak time detector 207.

When a result subtracted by the subtractor 209 (peak time of the resolver output signal subtracted by the edge time of the square wave signal) is outside of a reference range, the limiter 210 removes the subtracted result to prevent malfunction.

The delay time calculator 211 calculates a phase delay time based on the peak time of the resolver output signal subtracted by the subtractor 209 (the peak time of the resolver output signal subtracted by the edge time of the square wave signal).

Here, a method of detecting a resolver signal of a motor based on the above configuration will be described in order as follows.

Figure 6:
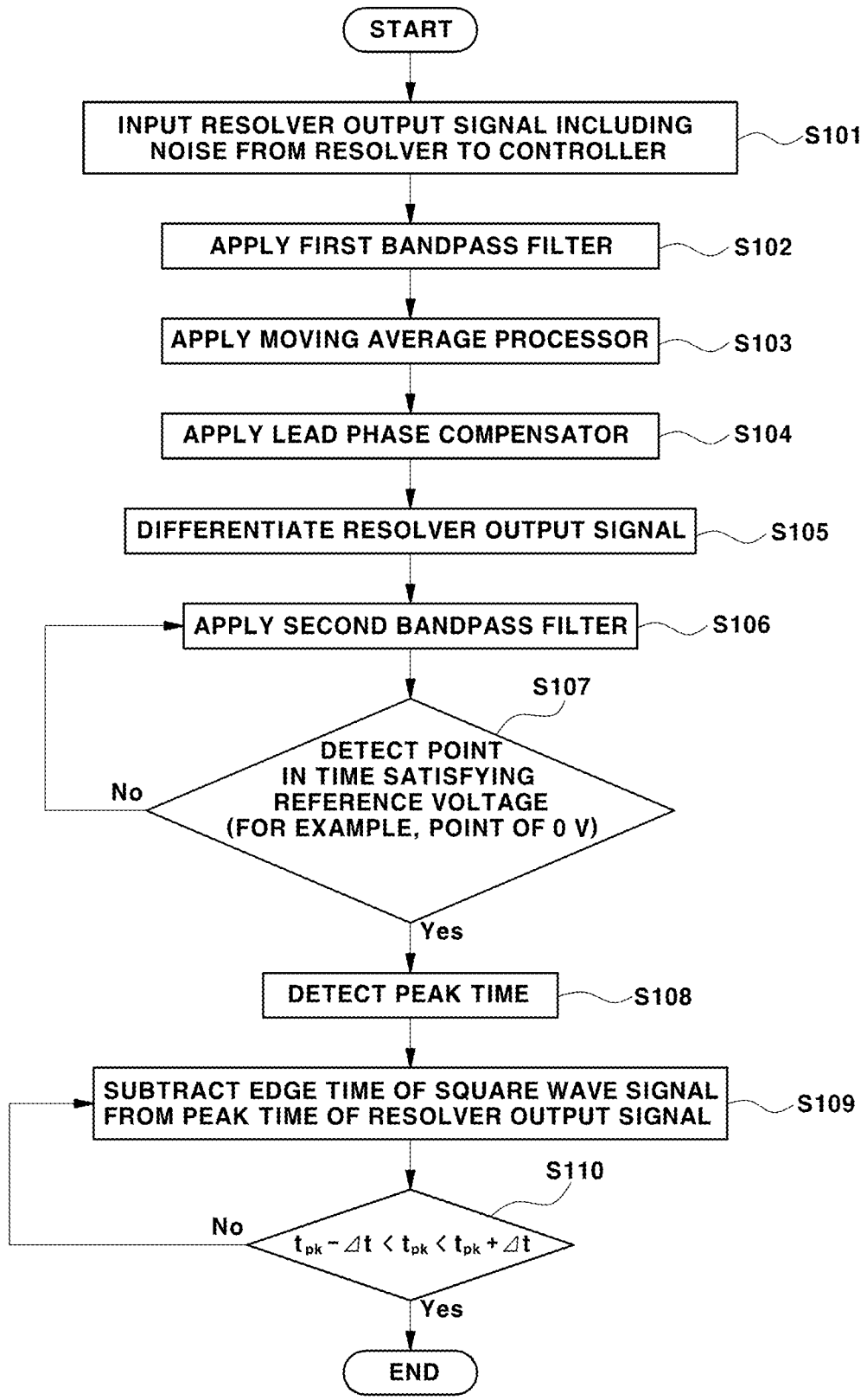
FIG. 6 is a flowchart illustrating a method for detecting the resolver signal of the motor according to the present disclosure.

FIG. 6 is a flowchart illustrating a method for detecting the resolver signal of the motor according to the present disclosure.

First, a sine wave or a cosine wave, which is a resolver output signal, is output from the resolver 100 to the controller 200 when the motor is driven.

The resolver 100 converts an excitation signal in the form of a square wave according to motor driving into a sine wave or a cosine wave using a filter included in a resolver circuit, and then outputs the sine wave or the cosine wave to the controller 200.

At this time, when harmonic noise, etc. is introduced into the sine wave or cosine wave, which is the resolver output signal, the resolver output signal into which the noise is introduced is input to the controller 200 (S101).

Then, the resolver output signal into which the noise is introduced passes through the first bandpass filter 201 of the controller 200 (S102).

Accordingly, the noise introduced into the resolver output signal may be primarily removed by the first bandpass filter 201 of the controller 200.

However, even when the resolver output signal output from the resolver 100 passes through the first bandpass filter 201, some noise is not completely removed, and a magnitude change and a phase delay time of the resolver output signal may occur.

In order to solve this problem, the resolver output signal passing through the first bandpass filter 201 passes through the moving average processor 202 (S103), and then passes through the lead phase compensator 203 (S104).

As described above with reference to FIG. 7, the moving average processor 202 repeats a process of calculating an average for data (resolver output signal of a predetermined period passing through the first bandpass filter) sequentially input to n preset buffers 202-1, a process of excluding data input to a last buffer among the n buffers 202-1, a process of moving data input to the n buffers 202-1 to adjacent buffers 202-1, a process of inputting new data to a first buffer among the n buffers 202-1, and a process of further calculating an average for data input to the n buffers 202-1 including the newly input data.

Through the continuous moving average calculation process for the resolver output signal of the moving average processor 202 as described above, the noise included in the resolver output signal may be completely removed, and the magnitude of the resolver output signal from which the noise is removed may be maintained at the original signal magnitude (the original magnitude of the resolver output signal before introduction of noise output from the resolver).

At this time, the resolver output signal passing through the first bandpass filter 201 and the moving average processor 202 may be maintained at the original signal magnitude with residual noise removed. However, a phase difference and a phase delay may occur compared to the original signal.

To this end, when the resolver output signal passes through the lead phase compensator 203 after passing through the moving average processor 202, the phase of the resolver output signal may be compensated to a phase level of the original signal (the resolver output signal before passing through the moving average processor).

To this end, the lead phase compensator 203 determines the phase to be compensated based on Equation 1 above. As described above, using the value $\omega_o$ defined as $2 \times \pi \times f_o$ (frequency of the original signal) and the value $\omega_p$ (value set to be larger than the frequency of the original signal for phase compensation), the phase of the resolver output signal after passing through the moving average processor may be compensated (for example, +2.5°) to the phase level before passing through the moving average processor.

As described above, it is possible to primarily remove noise of the resolver output signal output from the resolver 100 using the first bandpass filter, then completely remove noise in the resolver output signal through the continuous moving average calculation process for the resolver output signal and the lead compensation process for phase compensation, and accurately detect a peak magnitude, a peak time, a peak point, etc. of the resolver output signal.

Next, a process of calculating a substantial phase delay time, etc. of the resolver output signal is further performed using the differentiator 204, the second bandpass filter 205, the reference point detector 206, the peak time detector 207, the edge time detector 208, the subtractor 209, the limiter 210, the delay time calculator 211, etc. included in the controller 200.

To this end, first, the resolver output signal passing through the lead phase compensator 203 is differentiated by the differentiator 204 (S105), and the differentiated resolver output signal is filtered by the second bandpass filter 205 (S106).

In more detail, the resolver output signal passing through the first bandpass filter 201 passes through the moving average processor 202 to remove noise and passes through the lead phase compensator 203 to output the resolver output signal having the compensated phase, the resolver output signal having the compensated phase passes through the differentiator 204 and is differentiated by the differentiator 204 to output the differentiated resolver output signal, and the differentiated resolver output signal output from the differentiator 204 passes through the second bandpass filter 205 and is filtered by the second bandpass filter 205 to extract a signal in a preset specific band.

Next, the reference point detector 206 detects a point in time (for example, point of 0 V) at which the differentiated resolver output signal passing through the second bandpass filter 205 satisfies the reference voltage (S107), and the peak time detector 207 detects the peak time of the resolver output signal based on the time detected by the reference point detector 206 (S108).

Subsequently, calculation of subtracting the edge time of the square wave signal from the peak time of the detected resolver output signal is performed (S109).

In more detail, a process of detecting the edge time of the square wave signal by the edge time detector 208, and a process of subtracting the edge time of the square wave signal detected by the edge time detector 208 from the peak time of the resolver output signal detected by the peak time detector 207 by the subtractor 209 are performed.

Next, the delay time calculator 211 calculates a phase delay time based on the peak time of the resolver output signal subtracted by the subtractor 209 ($t_{pk}$, the peak time of the resolver output signal subtracted by the edge time of the square wave signal).

Preferably, when the peak time of the resolver output signal subtracted by the subtractor 209 ($t_p$k, the peak time of the resolver output signal subtracted by the edge time of the square wave signal) falls within a reference range ($t_{pk}-\Delta t < t_{pk} < t_{pk}+\Delta t$, $\Delta t$ is 2 μs as an example), the delay time calculator 211 calculates the phase delay time based thereon.

As such, when the substantial phase delay time of the resolver output signal is calculated using the differentiator 204, the second bandpass filter 205, the reference point detector 206, the peak time detector 207, the edge time detector 208, the subtractor 209, the limiter 210, the delay time calculator 211, etc. included in the controller 200, the first bandpass filter 201 and the moving average processor 202 are used to completely remove noise introduced into the resolver output signal and maintain the magnitude of the resolver output signal at the original magnitude without change, and the phase compensation process of the lead phase compensator 203 is used to compensate the phase delay time for the resolver output signal. As a result, the substantial phase delay time of the resolver output signal may be accurately calculated.

TEST EXAMPLES

Test Example 1

Figure 10A:
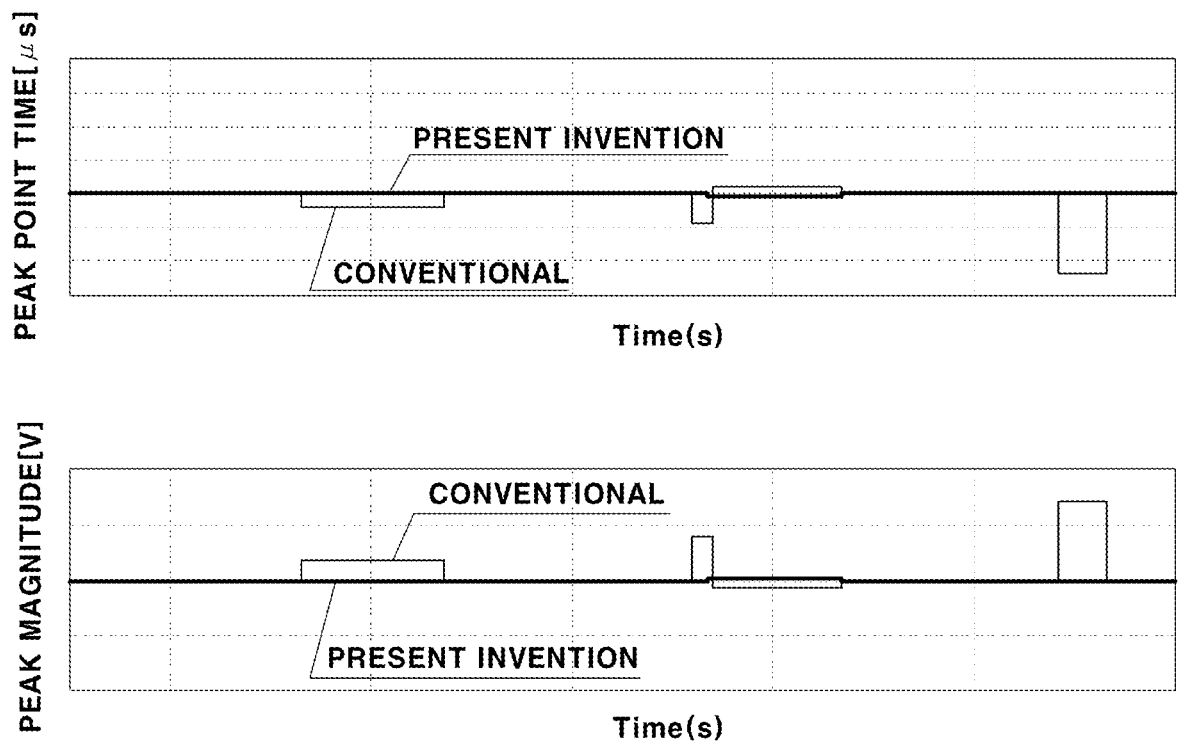
FIGS. 10A and 10B are graphs of measuring a peak time and a peak magnitude of the resolver output signal by applying a resolver signal detection method for the motor according to the present disclosure and an existing resolver signal detection method.
Figure 10B:
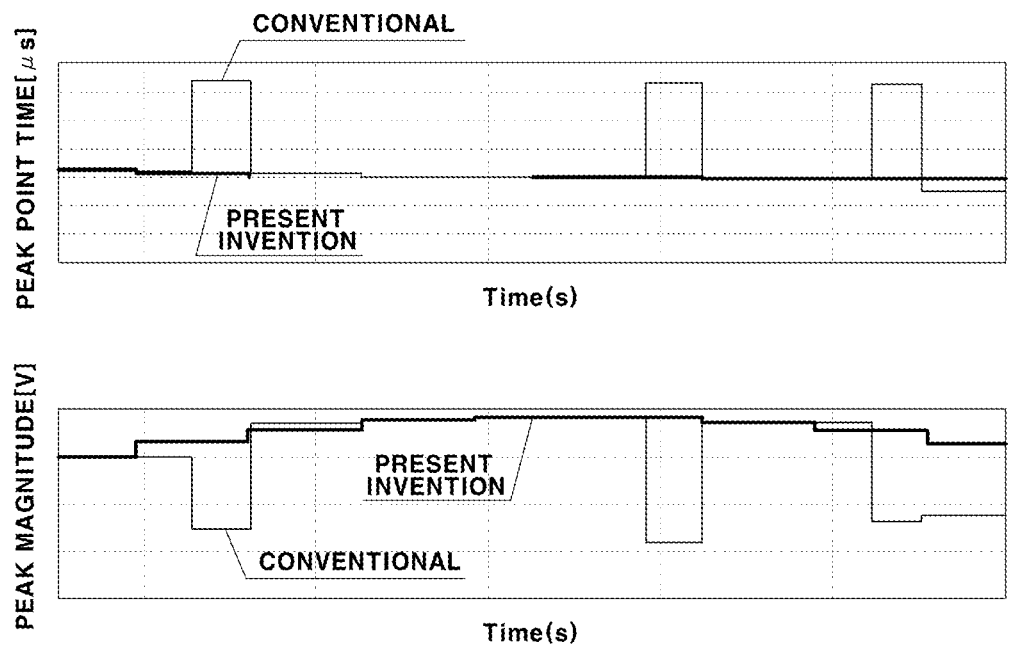

FIG. 10A is a graph of measuring a peak time and a peak magnitude of the resolver output signal at a motor speed of 0 RPM by applying a resolver signal detection method for the motor according to the present disclosure and an existing resolver signal detection method, and FIG. 10B is a graph of measuring a peak time and a peak magnitude of the resolver output signal at a motor speed of 14,000 RPM by applying the resolver signal detection method for the motor according to the present disclosure and the existing resolver signal detection method.

As an embodiment of the present disclosure, inverter switching was performed at motor speeds of 0 RPM and 14,000 RPM, respectively, to output a resolver output signal from the resolver, the output resolver output signal was sequentially passed through the first bandpass filter 201, the moving average processor 202, and the lead phase compensator 203, and then a peak time and a peak magnitude of the resolver output signal were measured.

As a comparative example, inverter switching was performed at motor speeds of 0 RPM and 14,000 RPM, respectively, to output a resolver output signal from the resolver, the output resolver output signal was only passed through the first bandpass filter 201 as in the past, and then a peak time and a peak magnitude of the resolver output signal were measured.

As a result of measurement, it was found that the peak time and the peak magnitude of the resolver output signal according to the embodiment of the present disclosure were constantly and accurately measured without significant fluctuation within the reference range as indicated in FIGS. 10A and 10B. On the other hand, it was found that the peak time and the peak magnitude of the resolver output signal according to the comparative example (existing) were irregularly and inaccurately measured such that the resolver output signal was outside of the reference range as indicated in FIGS. 10A and 10B.

As can be seen from the above Test Example 1, when the resolver output signal is sequentially passed through the first bandpass filter 201, the moving average processor 202, and the lead phase compensator 203, the peak time and magnitude of the resolver output signal used for motor control may be accurately measured. Accordingly, it is possible to improve the precision of motor control.

Test Example 2

Figure 11A:
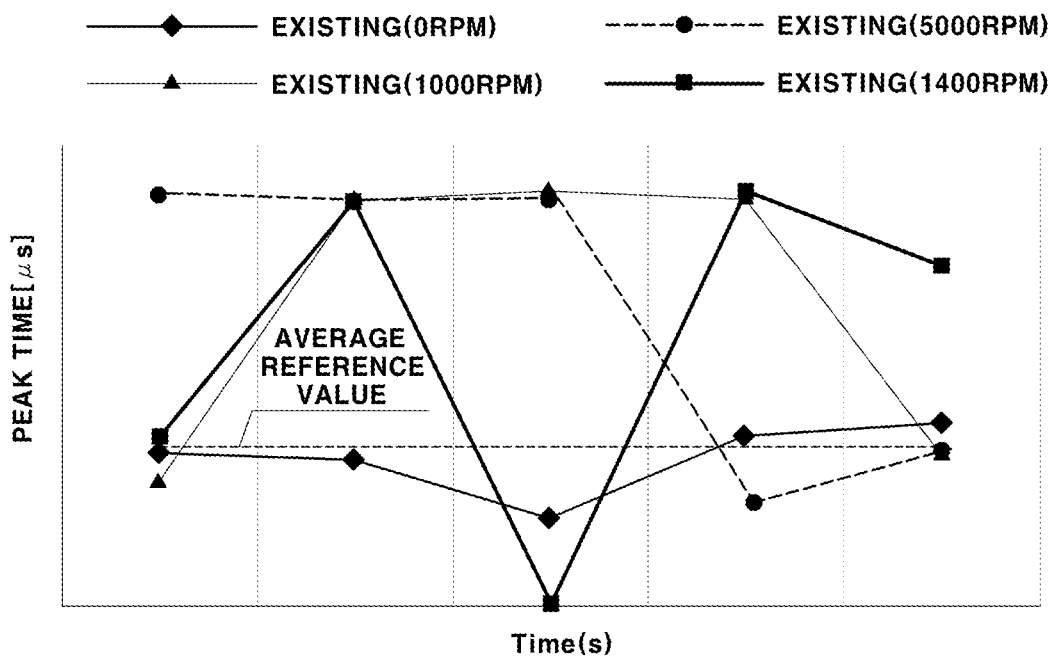
FIG. 11A is a graph of measuring a peak time of the resolver output signal for each motor RPM by applying the existing resolver signal detection method.
Figure 11B:
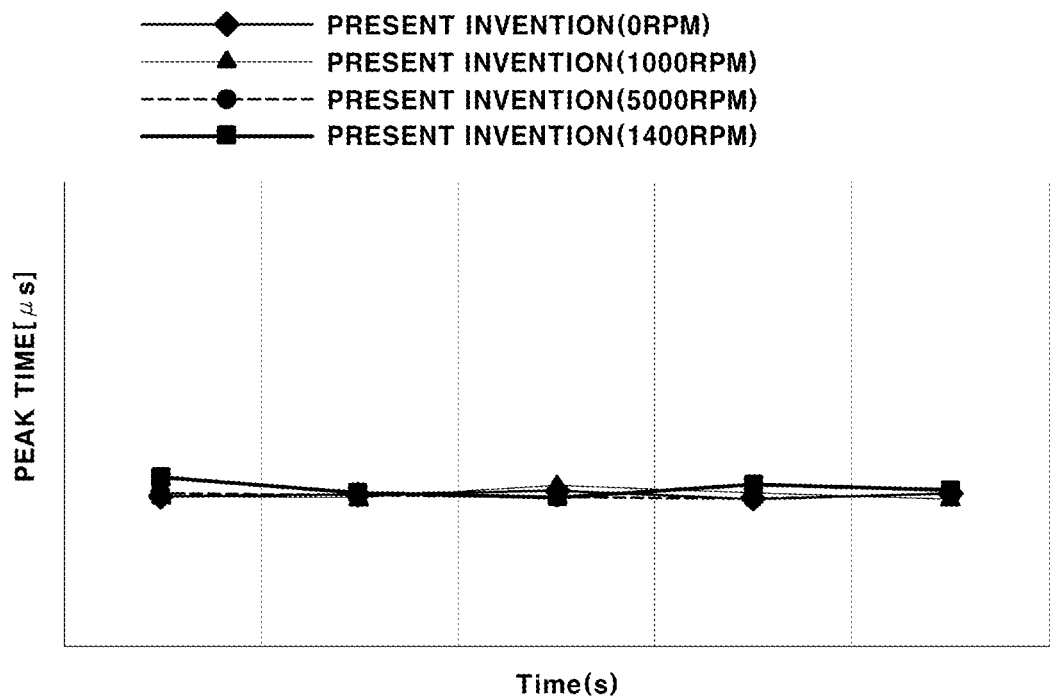
FIG. 11B is a graph of measuring a peak time of the resolver output signal for each motor RPM by applying the resolver signal detection method according to the present disclosure.

FIG. 11A is a graph of measuring a peak time for each motor RPM by applying the existing resolver signal detection method, and FIG. 11B is a graph of measuring a peak time for each motor RPM by applying the resolver signal detection method according to the present disclosure.

As a comparative example, inverter switching was performed for each motor speed (0 RPM, 5,000 RPM, 10,000 RPM, and 14,000 RPM) to output a resolver output signal from the resolver, the output resolver output signal was passed only through the first bandpass filter 201 as in the past, and then a peak time of the resolver output signal was measured.

As an embodiment of the present disclosure, inverter switching was performed for each motor speed (0 RPM, 5,000 RPM, 10,000 RPM, and 14,000 RPM) to output a resolver output signal from the resolver, the output resolver output signal was sequentially passed through the first bandpass filter 201, the moving average processor 202, and the lead phase compensator 203, and then a peak time of the resolver output signal was measured.

As a result of measurement, in the case of the comparative example (existing), as illustrated in FIG. 11A, it was found that an error of ±20 to 30 µs occurred in the peak time of the resolver output signal for each motor speed (0 RPM, 5,000 RPM, 10,000 RPM, and 14,000 RPM) compared to an average reference value (for example, 31 µs).

On the other hand, in the case of the present disclosure, as illustrated in FIG. 11B, it was found that only a minute error of ±1 µs was present in the peak time of the resolver output signal for each motor speed (0 RPM, 5,000 RPM, 10,000 RPM, and 14,000 RPM) compared to the average reference value (for example, 31 µs).

As can be seen from Test Example 2 above, when the resolver output signal is sequentially passed through the first bandpass filter 201, the moving average processor 202, and the lead phase compensator 203, the peak time of the resolver output signal used to control the motor for each RPM of the motor may be accurately measured, and accordingly, precision of the motor control may be improved.

Test Example 3

Figure 12A:
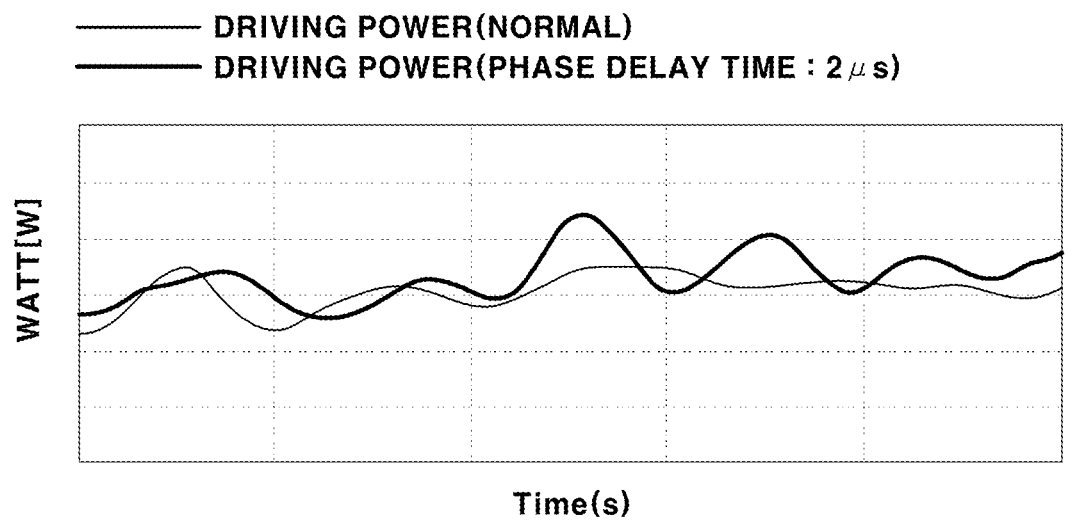
FIGS. 12A and 12B are graphs comparing output power of the motor before and after a phase delay is reduced by the resolver signal detection method for the motor according to the present disclosure.
Figure 12B:
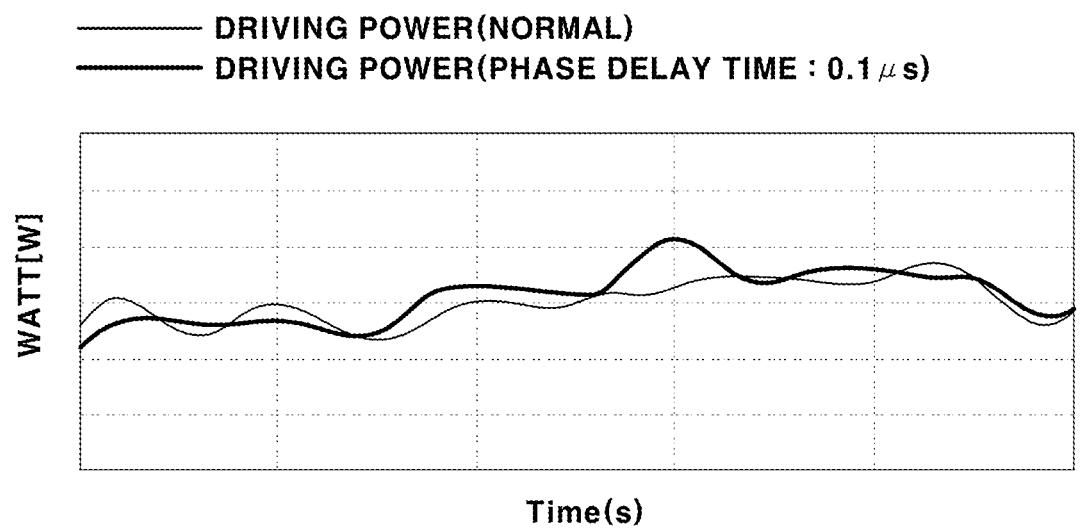

FIGS. 12A and 12B are graphs comparing output power of the motor before and after a phase delay is reduced by the resolver signal detection method for the motor according to the present disclosure.

As a comparative example (existing), after passing the resolver output signal output from the resolver through only the first bandpass filter 201 as in steps S101 to S102 described above, steps S105 to S109 were performed to measure a substantial phase delay time (for example, 2 µs) of the resolver output signal, and driving power of the controlled motor (for example, controlling the motor speed at 1,000 RPM in a slope driving situation of an electric vehicle) was measured based on the measured phase delay time (for example, 2 µs). A result thereof is illustrated in FIG. 12A.

As an embodiment of the present disclosure, after sequentially passing the resolver output signal output from the resolver through the first bandpass filter 201, the moving average processor 202, and the lead phase compensator 203 as in steps S101 to S104 described above, steps S105 to S109 were performed to measure a substantial phase delay time of the resolver output signal, and driving power of the controlled motor (for example, controlling the motor speed at 1,000 RPM in a slope driving situation of an electric vehicle) was measured based on the measured phase delay time (for example, 0.1 µs). A result thereof is illustrated in FIG. 12B.

As a result of measurement, in the case of the comparative example (existing), as illustrated in FIG. 12A, it was found that a large error occurred between driving power having a phase delay time (for example, 2 µs) and motor driving power of a normal level. On the other hand, in the case of the present disclosure, as illustrated in FIG. 12B, it was found that an error between driving power having a phase delay time (for example, 0.1 µs) and motor driving power of a normal level was greatly reduced.

As can be seen from the above Test Example 2, the resolver signal detection system for the motor according to the present disclosure may be applied to a driving power control system for the motor to improve control precision thereof.

According to some aspects, the controller 200 and the components such as a first bandpass filter 201, the moving average processor 202, the lead phase compensator 203, the differentiator 204, the second bandpass filter 205, the reference point detector 206, the peak time detector 207, the edge time detector 208, the subtractor 209, the limiter 210, and the delay time calculator 211 may be implemented by circuits and/or an instruction in a form of software stored in a storage of the controller. When a processor of the controller 200 reads and executes the software, the processor of the controller 200 may be configured to cause the various components of the controller 200 to perform the corresponding operations.

Through the means for solving the above problems, the present disclosure provides the following effects.

First, by passing noise of the resolver output signal output from the resolver through the first bandpass filter and the moving average processor, it is possible to completely remove noise introduced into the resolver output signal, and to maintain the magnitude of the resolver output signal at the original magnitude without change.

Second, the phase delay time for the resolver output signal is allowed to be compensated by using the phase compensation process of the lead phase compensator for the resolver output signal passing through the first bandpass filter and the moving average processor, so that the peak magnitude, the peak time, and the peak point of the resolver output signal may be accurately detected.

Third, as noise removal, magnitude maintenance, and phase delay time compensation for the resolver output signal are performed, precision of motor control using the resolver output signal may be greatly improved.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A system for detecting a resolver signal for controlling a motor, the system comprising:
a resolver configured to generate a resolver output signal of a sine wave or a cosine wave when the motor is driven, and output the resolver output signal to a controller; and
the controller including a first bandpass filter for primarily removing noise introduced into the resolver output signal, a moving average processor for performing a continuous moving average calculation process for a resolver output signal passing through the first bandpass filter, and a lead phase compensator for compensating a phase of a resolver output signal passing through the moving average processor,
wherein the moving average processor is configured to determine the number of pieces of data for moving average for an output signal of the resolver passing through the first bandpass filter by dividing a sampling frequency of a predetermined specific period by a frequency of an output signal of the resolver.

2. The system of claim 1, wherein, when the resolver output signal of a predetermined period passing through the first bandpass filter is sequentially input as continuous data to a preset number (n) of buffers, the moving average processor is configured to repeatedly calculate an average for each piece of sequentially input data.

3. The system of claim 1, wherein the lead phase compensator is configured to compensate the phase of the resolver output signal after passing through the moving average processor to a phase level of a resolver output signal before passing through the moving average processor, which is an original signal.

4. The system of claim 3, wherein the lead phase compensator is configured to determine a phase to be compensated by $$G_{leadComp}(s) = k\frac{1 + s/\omega_o}{1 + s/\omega_p};$$

where $G_{leadComp}(s)$ denotes a phase to be compensated, k denotes a gain value, wo denotes the same value as a frequency value of the original signal which is the resolver output signal before passing through the moving average processor, and Op denotes a value set larger than the frequency value of the original signal.

5. The system of claim 1, wherein the controller further includes:
a differentiator configured to differentiate and output a resolver output signal having a phase compensated by passing through the lead phase compensator;
a second bandpass filter configured to filter the differentiated resolver output signal output from the differentiator to extract a signal in a preset specific band;
a reference point detector configured to detect a point in time when the differentiated resolver output signal passing through the second bandpass filter satisfies a reference voltage;
a peak time detector configured to detect a peak time of the resolver output signal based on a point in time detected by the reference point detector;
an edge time detector configured to detect an edge time of a square wave signal;
a subtractor configured to subtract the edge time of the square wave signal detected by the edge time detector from the peak time of the resolver output signal detected by the peak time detector; and
a delay time calculator configured to calculate a phase delay time based on a peak time of the resolver output signal subtracted by the subtractor.

6. The system of claim 5, wherein the controller further includes a limiter configured to remove a result of subtraction to prevent malfunction when the peak time of the resolver output signal subtracted by the edge time of the square wave signal by the subtractor is outside of a reference range.

7. A method for detecting a resolver signal for controlling a motor, the method comprising:
generating and outputting a resolver output signal of a sine wave or a cosine wave when the motor is driven;
primarily removing, by a first bandpass filter, noise introduced into a resolver output signal;
performing, by a moving average processor, a continuous moving average calculation process for a resolver output signal passing through the first bandpass filter;
performing, by a lead phase compensator, a process of compensating a phase of a resolver output signal passing through the moving average processor; and
determining, by the moving average processor, the number of pieces of data for moving average for an output signal of the resolver passing through the first bandpass filter by dividing a sampling frequency of a predetermined specific period by a frequency of an output signal of the resolver.

8. The method of claim 7, wherein, when the resolver output signal of a predetermined period passing through the first bandpass filter is sequentially input as continuous data to a preset number (n) of buffers, the moving average calculation process is performed by repeatedly calculating an average for each piece of sequentially input data.

9. The method of claim 8, wherein the moving average calculation process is performed by repeating:

a process of calculating an average for a resolver output signal of a predetermined period passing through the first bandpass filter, which is data sequentially input to the preset number (n) of buffers;

a process of excluding data input to a last buffer among the preset number (n) of buffers;

a process of moving data input to the n preset buffers to adjacent buffers;

a process of inputting new data to a first buffer among the preset number (n) of buffers; and a process of calculating an average for data input to the preset number (n) of buffers including newly input data.

10. The method of claim 7, wherein the process of compensating the phase is a process of compensating the phase of the resolver output signal after passing through the moving average processor to a phase level of a resolver output signal before passing through the moving average processor, which is an original signal.

11. The method of claim 10, wherein, in the process of compensating the phase, a phase to be compensated is determined by $$G_{leadComp}(s) = k\frac{1 + s/\omega_o}{1 + s/\omega_p};$$

where $G_{leadComp}(s)$ denotes a phase to be compensated, k denotes a gain value, wo denotes the same value as a frequency value of the original signal which is the resolver output signal before passing through the moving average processor, and Op denotes a value set larger than the frequency value of the original signal.

12. The method of claim 7, further comprising:

differentiating a resolver output signal having a phase compensated by passing through the lead phase compensator;

filtering the differentiated resolver output signal to extract a signal in a preset specific band;

detecting a point in time when the differentiated resolver output signal satisfies a reference voltage;

detecting a peak time of the resolver output signal based on a detected point in time;

detecting an edge time of a square wave signal;

subtracting the detected edge time of the square wave signal from the detected peak time of the resolver output signal; and calculating a phase delay time based on a subtracted peak time of the resolver output signal.

13. The method of claim 12, further comprising removing a result of subtraction to prevent malfunction when the peak time of the resolver output signal subtracted by the edge time of the square wave signal is outside of a reference range.

\* \* \* \* \*